United States Patent
Hayakawa et al.

(10) Patent No.: US 11,282,505 B2
(45) Date of Patent: Mar. 22, 2022

(54) ACOUSTIC SIGNAL PROCESSING WITH NEURAL NETWORK USING AMPLITUDE, PHASE, AND FREQUENCY

(71) Applicant: KABUSHIKI KAISHA TOSHIBA, Tokyo (JP)

(72) Inventors: Daichi Hayakawa, Chiba (JP); Takehiko Kagoshima, Kanagawa (JP); Hiroshi Fujimura, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 202 days.

(21) Appl. No.: 16/296,282

(22) Filed: Mar. 8, 2019

(65) Prior Publication Data

US 2020/0066260 A1 Feb. 27, 2020

(30) Foreign Application Priority Data

Aug. 27, 2018 (JP) .............................. JP2018-158776

(51) Int. Cl.
| | |
|---|---|
| G10L 21/02 | (2013.01) |
| G10L 25/18 | (2013.01) |
| G10L 25/30 | (2013.01) |
| G10L 15/16 | (2006.01) |
| G10L 15/22 | (2006.01) |
| G10L 15/02 | (2006.01) |

(52) U.S. Cl.
CPC .............. *G10L 15/16* (2013.01); *G10L 15/02* (2013.01); *G10L 15/22* (2013.01); *G10L 2015/025* (2013.01); *G10L 2015/027* (2013.01)

(58) Field of Classification Search
CPC ..... G10L 15/16; G10L 21/02; G10L 21/0216; G10L 25/03; G10L 25/18; G10L 25/30; G06N 3/02; G06N 3/04; G06N 3/0454
USPC ....... 704/202, 226, 231, 232, 233, 251, 254, 704/205; 706/20, 24
See application file for complete search history.

(56) References Cited

U.S. PATENT DOCUMENTS

| | | | | |
|---|---|---|---|---|
| 5,692,098 | A * | 11/1997 | Kurdziel | G10L 19/02 704/205 |
| 10,614,827 | B1 * | 4/2020 | Korjani | G10L 15/063 |
| 10,832,660 | B2 * | 11/2020 | Fazeldehkordi | G10L 25/30 |
| 10,951,982 | B2 * | 3/2021 | Hayakawa | G10L 21/0208 |
| 2004/0165736 | A1 * | 8/2004 | Hetherington | G10L 21/0232 381/94.3 |
| 2014/0257803 | A1 * | 9/2014 | Yu | G10L 15/07 704/232 |

(Continued)

OTHER PUBLICATIONS

Lu et al., "Speech Enhancement Based on Deep Denoising Autoencoder," INTERSPEECH, 5 pages (2013).

*Primary Examiner* — Martin Lerner
(74) *Attorney, Agent, or Firm* — Finnegan, Henderson, Farabow, Garrett & Dunner L.L.P.

(57) ABSTRACT

According to one embodiment, a signal generation device includes one or more processors. The processors convert an acoustic signal and output amplitude and phase at a plurality of frequencies. The processors, for each of a plurality of nodes of a hidden layer included in a neural network that treats the amplitude and the phase as input, obtain frequency based on a plurality of weights used in arithmetic operation of the node. The processors generate an acoustic signal based on the plurality of obtained frequencies and based on amplitude and phase corresponding to each of the plurality of nodes.

11 Claims, 6 Drawing Sheets

(56) References Cited

U.S. PATENT DOCUMENTS

| | | | |
|---|---|---|---|
| 2015/0278686 A1* | 10/2015 | Cardinaux | G10L 15/16 |
| | | | 706/22 |
| 2017/0053203 A1* | 2/2017 | Hershey | G06N 3/084 |
| 2017/0092265 A1* | 3/2017 | Sainath | G10L 15/16 |
| 2017/0325023 A1* | 11/2017 | Nongpiur | H04R 3/005 |
| 2017/0353789 A1* | 12/2017 | Kim | G10L 25/30 |
| 2018/0053087 A1* | 2/2018 | Fukuda | G10L 15/20 |
| 2018/0174575 A1* | 6/2018 | Bengio | G10L 15/16 |
| 2018/0366138 A1* | 12/2018 | Ramprashad | G10L 21/0208 |
| 2020/0160848 A1* | 5/2020 | Rotem | G10L 15/16 |

* cited by examiner

ACOUSTIC SIGNAL PROCESSING WITH NEURAL NETWORK USING AMPLITUDE, PHASE, AND FREQUENCY

CROSS-REFERENCE TO RELATED APPLICATIONS

This application is based upon and claims the benefit of priority from Japanese Patent Application No. 2018-158776, filed on Aug. 27, 2018; the entire contents of which are incorporated herein by reference.

FIELD

Embodiments described herein relate generally to a signal generation device, a signal generation system, a signal generation method, and a computer program product.

BACKGROUND

In recent years, a number of signal processing techniques and acoustic models based on neural networks have been proposed. For example, a denoising autoencoder has been proposed that enables achieving noise removal as a result of learning a neural network in such a way that a Mel filter bank feature which is extracted from a speech having noise superimposed on clean signals is treated as the input and in such a way that the Mel filter bank feature which is extracted from the clean signals is treated as the output.

However, in the conventional technology, sometimes it is difficult to check whether or not a neural network has been correctly processed.

DETAILED DESCRIPTION

According to one embodiment, a signal generation device includes one or more processors. The processors convert an acoustic signal and output amplitude and phase at a plurality of frequencies. The processors, for each of a plurality of nodes of a hidden layer included in a neural network that treats the amplitude and the phase as input, obtain frequency based on a plurality of weights used in arithmetic operation of the node. The processors generate an acoustic signal based on the plurality of obtained frequencies and based on amplitude and phase corresponding to each of the plurality of nodes.

Preferred embodiments of a signal generation device according to the present invention are described below in detail with reference to the accompanying drawings.

First Embodiment

Examples of the signal processing performed using a neural network include the processing in which, from the signals including the speech of a plurality of speakers, the speech of some speakers is enhanced and speech recognition is performed based on the enhanced speech. In a neural network performing such processing, sometimes it is difficult to check whether or not, for example, the speech enhancement operation in the first half has been correctly performed.

The signal generation device according to a first embodiment generates time-series signals from the output of the hidden layers of a neural network. For example, in order to generate acoustic signals as time-series signals, it becomes necessary to have the information about the frequency apart from having the information about the amplitude and the phase. However, in a normal neural network, in the layers that deal with the amplitude and the phase, the information about the frequency is not held. In that regard, the signal generation device according to the first embodiment enables obtaining the information about the frequency from the weight of the neural network. Then, the signal generation device generates time-series signals using the information about the amplitude and the phase. Herein, a time-series signal is, for example, an acoustic signal of a speech. The following explanation is mainly given about an example in which speech signals are used as time-series signals.

Figure 1:
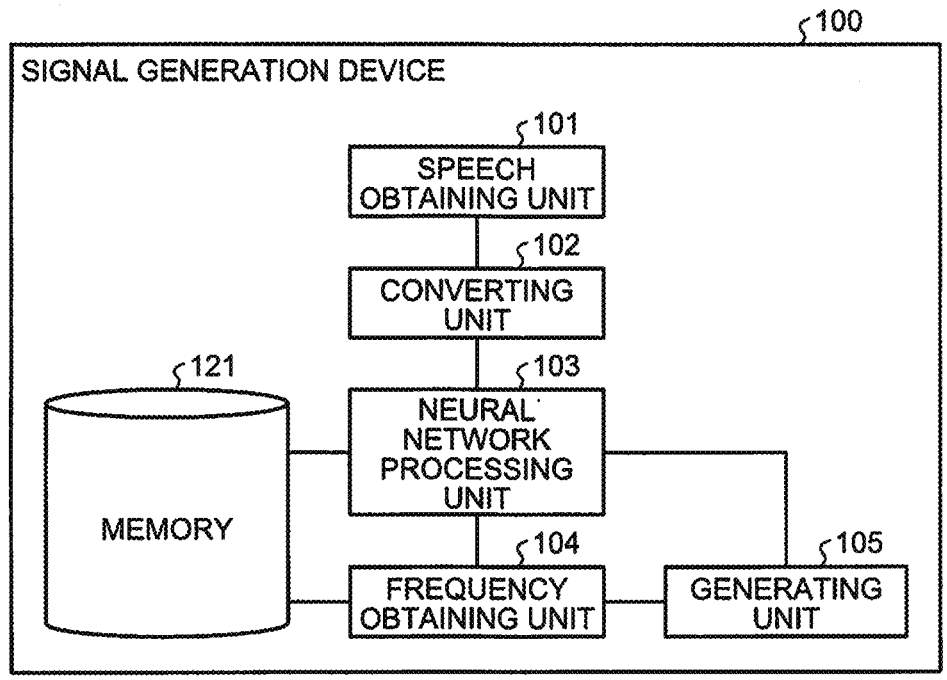
FIG. 1 is a block diagram of a signal generation device according to a first embodiment.

FIG. 1 is a block diagram illustrating an exemplary configuration of a signal generation device 100 according to the first embodiment. As illustrated in FIG. 1, the signal generation device 100 includes a speech obtaining unit 101, a converting unit 102, a neural network processing unit 103, a frequency obtaining unit 104, a generating unit 105, and a memory 121.

The speech obtaining unit 101 obtains target speech data for processing. For example, the speech obtaining unit 101 obtains speech signals collected by a sound collector such as a microphone.

The converting unit 102 performs conversion of a speech signal (an acoustic signal) and outputs the amplitude and the phase at a plurality of frequencies. For example, the converting unit 102 implements the short-time Fourier transform (STFT) for the conversion of a speech signal. However, the conversion method is not limited to the short-time Fourier transform. Alternatively, the converting unit 102 can implement the complex wavelet conversion.

The neural network processing unit 103 performs arithmetic operations using a neural network that has been learnt. Herein, the neural network is, for example, a complex neural network including a layer for inputting and outputting complex numbers.

The complex neural network includes an input-output layer and a layer in which parameters such as the weight and the bias are complex values. However, real numbers may also be included in the input-output elements and the parameter elements. In that case, the real numbers are treated as complex numbers having the imaginary part to be equal to "0". In the following explanation, the layer in which the input-output and the parameters are complex values is called a complex-valued layer, and the layer in which the input-output and the parameters are real numbers is called a real-valued layer. Herein, the complex neural network is configured with an input layer, one or more hidden layers, and an output layer.

To the input layer are input the amplitude and the phase that are obtained as a result of speech conversion performed by the converting unit 102. For example, the short-time Fourier transform feature is input to the input layer. Regarding a short-term Fourier feature $X(j, n)$, an amplitude $A_{jn}$ and a phase $\theta_{jn}$ are defined as follows. Herein, j represents the frequency bin number, and n represents the frame number.

Amplitude: $A_{jn}=|X(j, n)|$

Phase: $\theta_{jn}=\tan^{-1}(I\{X(j, n)\}/R\{X(j, n)\})$

Herein, $|\cdot|$ represents the arithmetic operation for taking the absolute value; $R\{\cdot\}$ and $I\{\cdot\}$ represent the arithmetic operations for taking the real part and the imaginary part, respectively; and $\tan^{-1}$ represents the inverse function of the tangent function.

Figure 2:
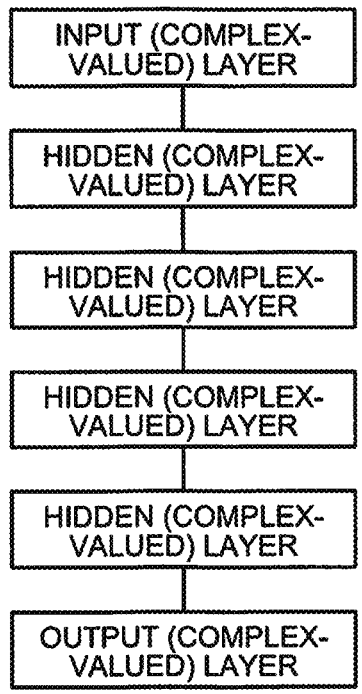
FIG. 2 is a diagram illustrating exemplary configurations of a complex neural network.
Figure 3:
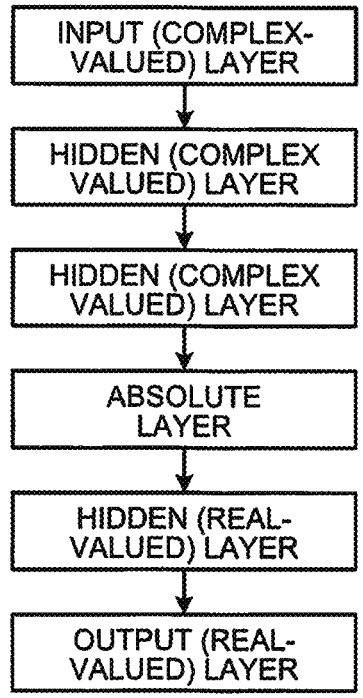
FIG. 3 is a diagram illustrating exemplary configurations of a complex neural network.

The hidden layers and the output layer either can be complex-valued layers or can be real-valued layers. FIGS. 2 and 3 are diagrams illustrating exemplary configurations of the complex neural network. As illustrated in FIG. 2, all layers from the input layer to the output layer can be complex-valued layers. Alternatively, as illustrated in FIG. 3, for example, an absolute layer for outputting the absolute value of the input can be provided in between two hidden layers; the layers from the input layer to the absolute layer can be set to be complex-valued layers; and the layers from the absolute layers to the output layer can be set to be real-valued layers.

Depending on whether the hidden layers are complex-valued layers or real-valued layers, different type of processing is performed therein. For example, in a complex-valued layer, the input thereto is weighted and then a nonlinear function is applied with respect to the absolute value without varying the phase information. In a real-valued layer, the input thereto is weighted and then a nonlinear function is applied.

Given below are two examples of arithmetic operations performed in each layer, when there are three hidden layers.

(Example 1) Case when there are Three Complex-Valued Layers as Hidden Layers and when the Output Layer is Also a Complex-Valued Layer Hidden layer 1 (complex number):
$h_1(n)=\tan h(|C_1X(n)|)\exp(i\ \arg(C_1X(n)))$
Hidden layer 2 (complex number):
$h_2(n)=\tan h(|C_2h_1(n)|)\exp(i\ \arg(C_2h_1(n)))$
Hidden layer 3 (complex number):
$h_3(n)=\tan h(|C_3h_2(n)|)\exp(i\ \arg(C_3h_2(n)))$
Output layer (complex number):
$out(n)=\tan h(|C_Oh_3(n)|)\exp(i\ \arg(C_Oh_3(n)))$ (Example 2) Case when there is a Single Complex-Valued Layer as a Hidden Layer and a Single Real-Valued Layer as a Hidden Layer; when an Absolute Layer is Present; and when the Output Layer is a Real-Valued Layer Hidden layer 1 (complex number):
$h_1(n)=\tan h(|C_1X(n)|)\exp(i\ \arg(C_1X(n)))$
Absolute layer: $h_2(n)=|h_1(n)|$
Hidden layer 3 (real number): $h_3(n)=\tan h(R_3h_2(n))$
Output layer (real number): $out(n)=\tan h(R_Oh_3(n))$ Herein, $X(n)$ represents the short-term Fourier transform feature of the n-th frame, and represents a vector having $X(i, j)$ as elements as given below in Equation (1). Moreover, J represents the total number of frequency bins.

$$X(n)=[X(1,n),X(2,n),\ldots,X(J,n)] \quad (1)$$

Furthermore, $h_1(n)$, $h_2(n)$, $h_3(n)$, and $h_O(n)$ are vectors representing the first hidden layer, the second hidden layer, the third hidden layer, and the output layer, respectively. Moreover, $C_1$, $C_2$, $C_3$, and $C_O$ are matrices (weighted matrices) representing the weights (complex numbers) of the first hidden layer, the second hidden layer, the third hidden layer, and the output layer, respectively. Furthermore, $R_3$ and $R_O$ are matrices (weighted matrices) representing the weights (real numbers) of the third layer and the output layer, respectively. Moreover, i represents the imaginary unit. Furthermore, $|\cdot|$ represents the arithmetic operation for taking the absolute value. Moreover, tan h represents the arithmetic operation for applying the hyperbolic tangent function to the elements of the vectors. Furthermore, arg represents the arithmetic operation for obtaining the phase of the elements of the vectors.

Regarding the decision on whether the model in which all layers from the input layer to the output layer are complex-valued layers (i.e., Example 1) is to be used, or whether the model in which an absolute layer is provided in between the input layer and the output layer and in which the output layer is a real-valued layer (i.e., Example 2) is to be used; the decision can be taken depending on the intended end-usage. For example, in the case of using a complex neural network for implementing a denoising autoencoder in which the short-time Fourier feature extracted from a speech having noise superimposed on clean signals (noiseless speech signals) is treated as the input and in which the short-time Fourier feature extracted from the clean signals is treated as the output; the model in which all layers from the input layer to the output layer are complex-valued layers is used.

On the other hand, in the case of using a complex neural network for implementing an acoustic model that outputs the posterior probability of each processing unit representing at least either a phoneme, or a syllable, or a character, or a word piece, or a word; the output needs to be in real numbers. For that reason, the model in which an absolute layer is provided in between the input layer and the output layer and in which the output layer is a real-valued layer is used.

As far as the learning of the weight of a complex neural network is concerned, the method given below in "Reference Literature 1" can be implemented regarding the real-valued layers, and the method given below in "Reference Literature 2" can be implemented regarding the complex-valued layers.

<Reference Literature 1> P. J. Werbos, "Backpropagation Through Time: What it Does and How to Do It", Proceedings of the IEEE, vol. 78, no. 10, pp. 1550-1560. October 1990.

<Reference Literature 2> T. Nitta, "An extension of the back-propagation algorithm to complex numbers", Neural Netw., vol. 10, no. 8, pp. 1391-1415, November 1997.

Returning to the explanation with reference to FIG. 1, for each of a plurality of nodes of the hidden layer in which time-series signals are to be generated (the target layer), the frequency obtaining unit 104 obtains the frequency based on a plurality of weights. Regarding the operations performed by the frequency obtaining unit 104, the details are given later.

The generating unit 105 generates an acoustic signal (a time-series signal) based on the frequency for each of a plurality of nodes as obtained by the frequency obtaining unit 104 and based on the amplitude and the phase corresponding to each node. For example, as given below in Equation (2), the generating unit 105 synthesizes the signal of each node in each frame; sequentially concatenates the generated signals from the first frame to the last frame; and generates a time-series signal. Herein, $x_n^{out}(t)$ and $z_{k,n}^{out}$ represent the generated signal and the output in the k-th node, respectively, when X(n) is input in the input layer. Moreover, |•| represents the arithmetic operation for taking the absolute value, and arg represents the arithmetic operation for obtaining the phase of each element of a vector. Furthermore, $|z_{k,n}^{out}|$ and $\arg(z_{k,n}^{out})$ represent the amplitude in the k-th node and the phase, respectively, when X(n) is input in the input layer. Moreover, $\omega_{k,n}$ represents the frequency in the k-th node when X(n) is input in the input layer, and K represents the total number of nodes.

$$x_n^{out}(t) = \sum_{k=1}^{K} |z_{k,n}^{out}| \cos(2\pi \omega_{k,n} t + \arg(z_{k,n}^{out})) \quad (2)$$

Meanwhile, the method for generating a time-series signal is not limited to Equation (2). That is, as long as a time-series signal can be generated based on the frequency, the amplitude, and the phase; any method can be implemented. For example, in Equation (2), the cosine (cos) can be replaced with sine (sin).

The memory 121 is used to store a variety of information used in various operations performed in the signal generation device 100. For example, the memory 121 is used to store the already-learnt parameters (such as the weight) of the neural network that are used in the arithmetic operations performed by the neural network processing unit 103. The memory 121 can be configured using any one of the commonly-used memory mediums such as a flash memory, a memory card, a random access memory (RAM), a hard disk drive (HDD), or an optical disk.

The constituent elements described above (the speech obtaining unit 101, the converting unit 102, the neural network processing unit 103, and the frequency obtaining unit 104) are implemented, for example, using one or more processors. For example, the constituent elements can be implemented when a processor such as a central processing unit (CPU) executes a computer program, that is, can be implemented using software. Alternatively, the constituent elements can be implemented using a processor such as a dedicated integrated circuit (IC), that is, can be implemented using hardware. Still alternatively, the constituent elements can be implemented using a combination of software and hardware. In the case of using a plurality of processors, each processor can be configured to implement either one constituent element or two or more constituent elements.

Figure 4:
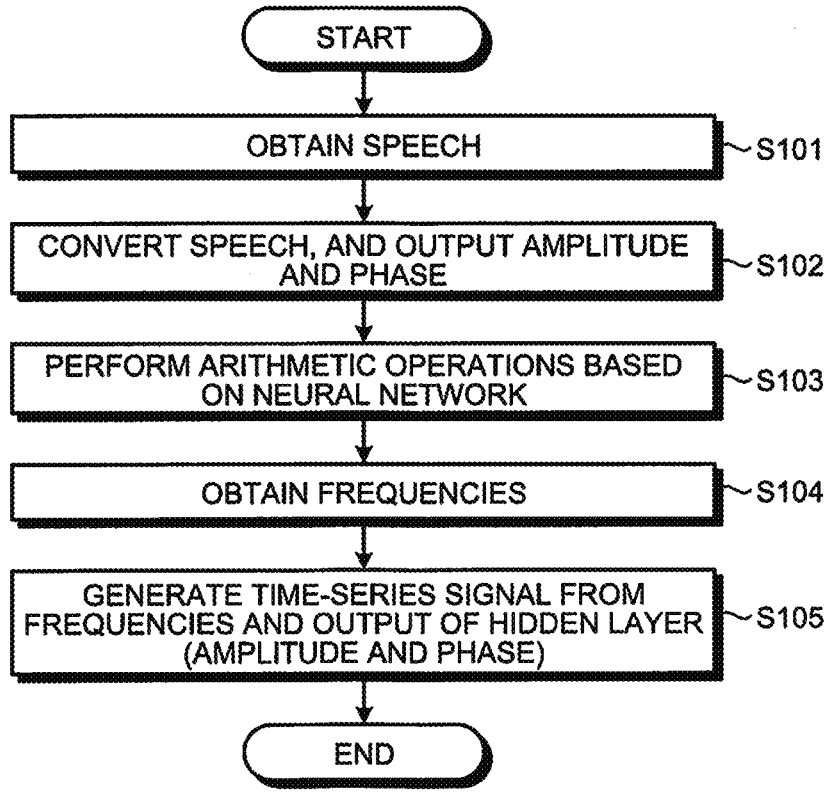
FIG. 4 is a flowchart for explaining an example of a signal generation operation according to the first embodiment.

Given below is the explanation of a signal generation operation performed in the signal generation device 100 configured in the abovementioned manner according to the first embodiment. FIG. 4 is a flowchart for explaining an example of the signal generation operation according to the first embodiment.

The speech obtaining unit 101 obtains the target speech data for processing that is collected using a microphone (Step S101). The converting unit 102 converts the collected speech using, for example, the short-time Fourier transform and outputs the amplitude and the phase (Step S102). The neural network processing unit 103 treats the amplitude and the phase as the input and performs arithmetic operations based on an already-learnt neural network (Step S103). The frequency obtaining unit 104 obtains the frequency for each of a plurality of nodes in the target layer (Step S104). The generating unit 105 generates a time-series signal (a speech signal) from the obtained frequencies and from the amplitude and the phase representing the output of the target layer (Step S105).

Given below is more detailed description about the generation operation for generating a time-series signal from a complex-valued layer of a complex neural network.

During the generation of a time-series signal from a complex-valued layer of a complex neural network, the amplitude and the phase as obtained by conversion in advance by the converting unit 102 are used along with the learnt complex neural network. For example, the premise is that a complex neural network of one of the following types is learnt.

An acoustic model in which the short-time Fourier conversion feature of speech is treated as the input and in which the posterior probability of each processing unit representing at least either a phoneme, or a syllable, or a character, or a word piece, or a word is treated as the output.

A denoising autoencoder in which the short-time Fourier feature obtained from a noise-superimposed speech representing a speech having noise superimposed on clean signals is treated as the input and in which the short-time Fourier feature extracted from the clean signals is treated as the output.

Figure 5:
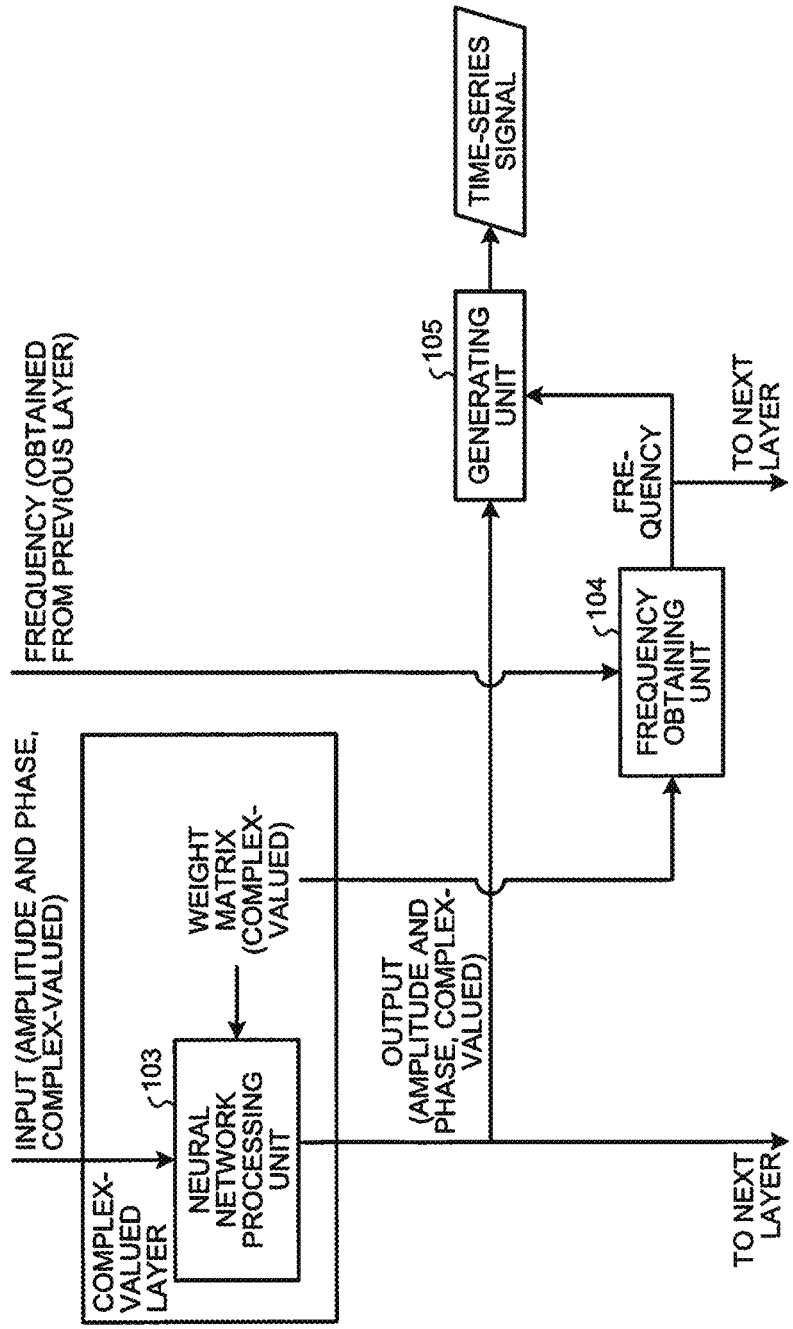
FIG. 5 is a diagram for explaining a flow of a generation operation for generating a time-series signal in a complex-valued layer.

The target layer for generating a time-series signal is a complex-valued layer, for example. FIG. 5 is a diagram for explaining a flow of the generation operation for generating a time-series signal in a complex-valued layer.

Regarding the complex-valued layer, the neural network processing unit 103 performs arithmetic operations with respect to complex values using a weighting matrix of complex numbers. For example, arithmetic operations that are explained earlier with reference to (Example 1) or (Example 2) are performed. When the amplitude and the phase of each node as output by the neural network processing unit 103 and the frequency obtained at each node by the frequency obtaining unit 104 are input to the generating unit 105, a time-series signal is generated from the target layer.

Figure 6:
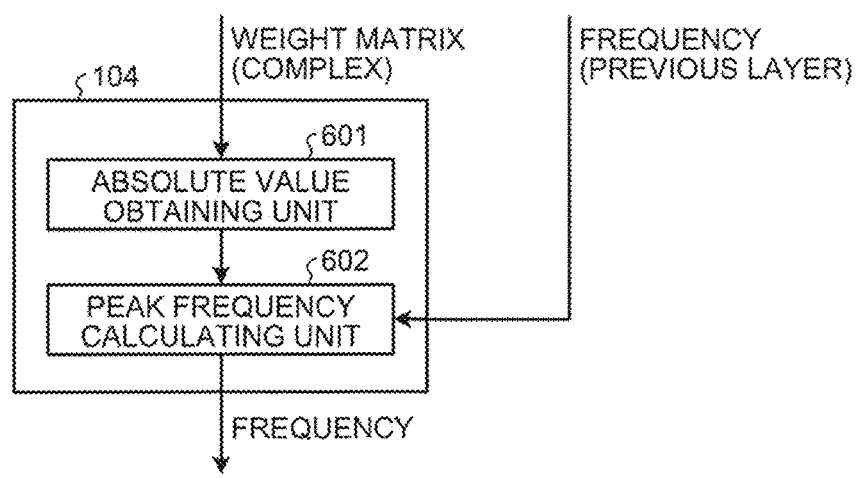
FIG. 6 is a diagram illustrating an exemplary detailed functional configuration of a frequency obtaining unit.

Given below are the details of the frequency obtaining operation performed by the frequency obtaining unit 104. FIG. 6 is a diagram illustrating an exemplary detailed functional configuration of the frequency obtaining unit 104.

As illustrated in FIG. 6, the frequency obtaining unit 104 includes an absolute value obtaining unit 601 and a peak frequency calculating unit 602. The absolute value obtaining unit 601 calculates the absolute value of each element of the weighting matrix of complex numbers, and obtains the absolute value of the weight. The peak frequency calculating unit 602 obtains, for each of a plurality of nodes of the target layer, such a node in the previous layer that corresponds to the weight having the highest absolute value from among a plurality of corresponding weights; and obtains the frequency to be set for the obtained node (i.e., obtains the peak frequency).

Figure 7:
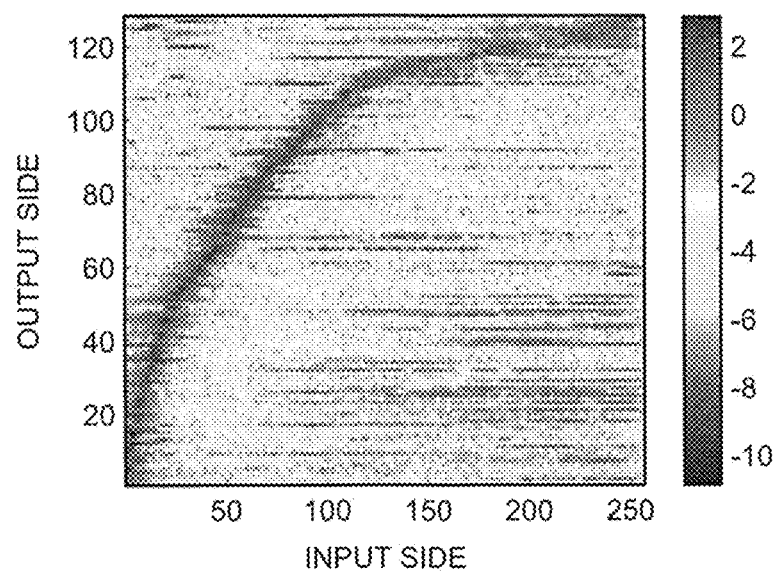
FIG. 7 is a diagram illustrating an example of the distribution of the absolute values of the weights.

When the complex neural network is learnt, the absolute values of the weights are distributed in such a way that, to each node included in the output of the complex-valued layers, the information from some nodes included in the input to the complex-valued layers is output in a focused manner. FIG. 7 is a diagram illustrating an example of the distribution of the absolute values of the weights.

In FIG. 7 is illustrated a distribution of the absolute values of the weights in the complex-valued layer that represents the subsequent layer to the input layer in the complex neural network that is learnt with the short-time Fourier conversion of a speech serving as the input. Herein, the horizontal axis represents the indexes of the nodes on the input side, and the vertical axis represents the indexes of the nodes on the output side. In the example illustrated in FIG. 7, the magnitude of the absolute values is indicated using a grayscale. Herein, it is indicated that the absolute value of a weight is higher in proportion to the closeness to the black color. By referring to FIG. 7, it is possible to understand the correspondence of each node on the output side with that node on the input side from which the information is output in a focused manner to the concerned node on the output side. For example, to the nodes near the 60-th node on the output side, the information from the nodes near the 50-th node on the input side is output in a focused manner. Thus, if the frequency of each node on the input side becomes known, it is possible to understand the frequency of signals output to each node on the output side.

The absolute value obtaining unit 601 illustrated in FIG. 6 obtains the absolute values of the weights. Then, the peak frequency calculating unit 602 obtains the information about the frequency of each node. To the peak frequency calculating unit 602 is input the information about the absolute values of the weights obtained by the absolute value obtaining unit 601 and the information about the frequencies of the nodes on the input side as obtained in the previous layer of the concerned complex-valued layer. If the previous layer is the input layer; then, for example, the central frequency in the frequency bin for the short-time Fourier conversion is obtained as the information about the frequency. In this way, the frequency of each node in each layer can be obtained by sequentially tracking the frequency of the corresponding previous frequency.

The peak frequency calculating unit 602 obtains, for each node on the output side (i.e., in the target layer), the peak (the highest value) of the absolute values of the weights. The peak frequency calculating unit 602 identifies that node on the input side which corresponds to the peak of the absolute values of the weights. The identified node on the input side represents the node from which the information is output in a focused manner to the concerned node. The peak frequency calculating unit 602 obtains the frequency at the identified node on the input side as the frequency of the concerned node on the output side.

Meanwhile, the hidden layer for which time-series signals are to be generated (i.e., the target layer) can be any layer. Moreover, the target layer is not limited to a single layer, and time-series signals can be generated for two or more target layers. In the case of implementing a denoising autoencoder, if the hidden layer close to the output layer is treated as the target layer, then whether or not the noise has been reduced can be checked in an efficient manner. In the case of implementing the acoustic model, in the layer close to the output layer, the feature gets normalized, and it can be assumed that the characteristics of the speaker disappear. Hence, if the characteristics of the speaker are to be checked, the hidden layer close to the input layer can be treated as the target layer.

In the case of implementing a model in which the speech of one of a plurality of speakers is enhanced, if the hidden layer close to the input layer is treated as the target layer, then it becomes possible to check a more natural speech. On the other hand, if the hidden layer close to the output layer is treated as the target layer, the whether or not the speeches of a plurality of speakers are separated can be checked with more ease. In this way, the hidden layer to be treated as the target layer can be decided according to the intended end-usage.

Till now, the explanation is given mainly for a case of generating a time-series signal from a complex-valued layer of a complex neural network. Alternatively, a time-series signal can be generated based on the output of a real-valued layer. In that case too, the information about the frequencies can be sequentially obtained from the nodes of the previous layer. Moreover, the information about the phase can be obtained from, for example, the corresponding complex-valued layer in the previous stage.

The frequency of each node used in the generation of a time-series signal need not be a single frequency corresponding to the peak of the absolute values of the weights. Alternatively, for example, for each node, a plurality of absolute values can be identified within a predetermined range from the peak, and the frequencies of a plurality of nodes on the input side that correspond to a plurality of absolute values can be obtained. For example, the generating unit 105 generates a time-series signal using the average value of a plurality of frequencies. For each node, a plurality of signals defined according to a plurality of obtained frequencies and according to the amplitudes and the phases of the nodes corresponding to the obtained frequencies can be used in synthesizing the time-series signals.

When the converting unit 102 represents wavelet conversion, an output Y(j, n) of the converting unit 102 is as given below in Equation (3).

$$Y(j, n) = \int_{-\infty}^{\infty} s_j^{-\frac{1}{2}} \overline{\psi\left(\frac{t - \tau_n}{s_j}\right)} x(t) dt \qquad (3)$$

($\overline{\psi(t)}$ represents a complex conjugate of $\psi(t)$)

Herein, j and n represent natural numbers. Moreover, x(t) represents the time-series signal to be input. Furthermore, $\phi(t)$ is called an analyzing wavelet function; and, for example, a Gaussian wavelet function as given below in Equation (4) is selected.

$$\psi(t) = (e^{iFt})e^{-\frac{t^2}{2}} \qquad (4)$$

Herein, i represents the imaginary unit, and F represents a positive constant number. Moreover, $s_j$ represents the scaling factor for expanding and reducing the analyzing wavelet function and is called a scaling coefficient; and, for example, is given below in Equation (5).

$$s_j = 2^{j/12} \qquad (5)$$

Furthermore, $\tau_n$ represents the time shift and is given below in Equation (6) with, for example, T being a constant number greater than zero.

$$\tau_n = nT \qquad (6)$$

As a result of performing the wavelet conversion, it becomes possible to obtain, from a signal, the components of the signal at a particular time-frequency. For example, in the case of using the Gaussian wavelet function as given earlier in Equation (4), Y(j, n) is equivalent to the component at the central frequency $F/(2\pi s_j)$ and the time $\tau_n$.

Of the wavelet conversion feature Y(j, n), an amplitude $B_{jn}$ and a phase $\phi_{jn}$ are defined as follows.

Amplitude: $B_{jn}=|Y(j, n)|$

Phase: $\phi_{jn}=\tan^{-1}(I\{Y(j, n)\}/R\{Y(j, n)\})$

Herein, $|\cdot|$ represents the arithmetic operation for taking the absolute value; $R\{\cdot\}$ and $I\{\cdot\}$ represent the arithmetic operations for taking the real part and the imaginary part, respectively; and $\tan^{-1}$ represents the inverse function of the tangent function.

In the input layer of the neural network, Y(n) having Y(j, n) as the element is input as given below in Equation (7). Herein, J is a natural number that can be freely decided by the user.

$$Y(n)=[Y(1,n),Y(2,n),\ldots,Y(J,n)] \quad (7)$$

As far as the arithmetic operations for a neural network are concerned, identical operations can be performed by substituting X(n) in (Example 1) and (Example 2) with Y(n).

When the converting unit 102 represents wavelet conversion, the generating unit 105 generates a time-series signal as given below in Equation (8), for example.

$$x_{out(t)} = R\left\{\sum_{n=1}^{N}\sum_{k=1}^{K}|z_{n,k}^{out}|\exp(i\arg|z_{n,k}^{out}|)\psi\left(\frac{t-\tau_n}{\Omega_k}\right)\right\} \quad (8)$$

Herein, K represents the total number of nodes, and N represents the total number of frames. Moreover, $z_{n,k}^{out}$ represents the output in the k-th node when Y(n) is input in the input layer. Furthermore, $|\cdot|$ represents the arithmetic operation for taking the absolute value; and arg represents the arithmetic operation for obtaining the phase of each element. Moreover, $|z_{n,k}^{out}|$ and arg $(z_{n,k}^{out})$ represent the amplitude and the phase, respectively, in the k-th node when Y(n) is input in the input layer. Furthermore, $\Omega_k$ represents the scale in the k-th node, and is obtained using Equation (9) given below in which $\omega_k$ represents the frequency in the k-th node.

$$\Omega_k=G/\omega_k \quad (9)$$

Herein, G is a constant number and, for example, $G=F/(2\pi)$ holds true when the analyzing wavelet function $\phi(t)$ is a Gaussian wavelet function.

In this way, in the signal generation device according to the first embodiment, the information about frequencies, amplitudes, and phases is obtained from the hidden layers of a neural network; and time-series signals are generated using the obtained information. If the input to the neural network is in the form of the feature extracted from a speech, then a speech signal can be generated as a time-series signal. If the generated speech signals are output as sound from an output device such as a speaker, then it becomes possible to intuitively understand the state of the neural network (such as whether the neural network has been correctly learnt). If acoustic signals (such as ultrasonic sound waves) other than speech signals are generated as time-series signals, then the acoustic signals can be output to an output device such as a display thereby making it possible to understand the state of the neural network.

Second Embodiment

In a signal generation system according to a second embodiment, some of the functions of the signal generation device according to the first embodiment are implemented in an external device (a server device). That is, in the signal generation system according to the second embodiment, the signal generation operation is performed in a dispersed manner among a plurality of devices.

Figure 8:
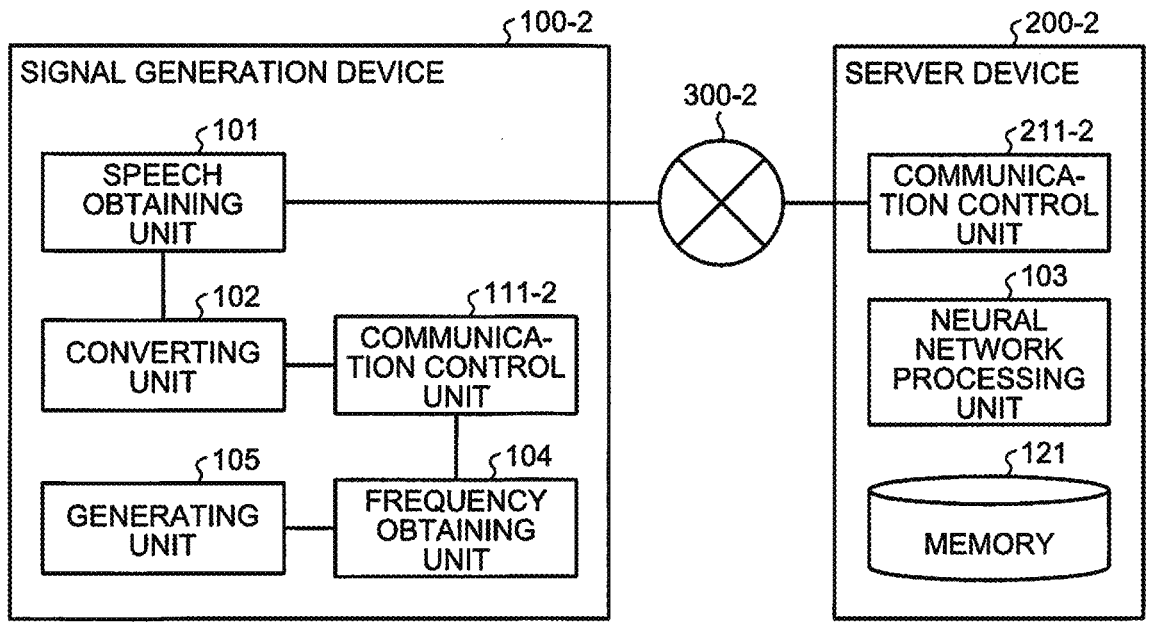
FIG. 8 is a block diagram of a signal generation device and a server device according to a second embodiment.

FIG. 8 is a block diagram illustrating an exemplary configuration of a signal generation device 100-2 and a server device 200-2 according to the second embodiment. As illustrated in FIG. 8, the signal generation device 100-2 and the server device 200-2 are connected to each other via a network 300-2. For example, the network 300-2 is the Internet. Alternatively, the network 300-2 can be a network of some other type.

The signal generation device 100-2 includes the speech obtaining unit 101, the converting unit 102, the frequency obtaining unit 104, the generating unit 105, and a communication control unit 111-2. The server device 200-2 includes a communication control unit 211-2, the neural network processing unit 103, and the memory 121.

In the second embodiment, the neural network processing unit 103 and the memory 121 are included in the server device 200-2, and are thus omitted from the signal generation device 100-2. Moreover, communication control units (the communication control units 111-2 and 211-2) are included in both devices. Meanwhile, the functions identical to the functions according to the first embodiment are referred to by the same reference numerals, and the explanation thereof is not given again.

The communication control unit 111-2 controls the communication with external devices such as the server device 200-2. For example, the communication control unit 111-2 sends information about amplitudes and phases, which is output by the converting unit 102, to the server device 200-2. Moreover, the communication control unit 111-2 receives, from the server device 200-2, information related to the neural network (such as the weight matrix) and information such as the processing result obtained by the neural network processing unit 103.

The communication control unit 211-2 controls the communication with external devices such as the signal generation device 100-2. For example, the communication control unit 211-2 receives the information about amplitudes and phases from the signal generation device 100-2. Moreover, the communication control unit 211-2 sends, to the signal generation device 100-2, the information related to the neural network and the information such as the processing result obtained by the neural network processing unit 103.

Meanwhile, the method of dispersing the functions is not limited to the example illustrated in FIG. 8, and any other dispersion method can be implemented. For example, the server device 200-2 can be equipped with the functions of the frequency obtaining unit 104 and the generating unit 105. In that case, the server device 200-2 becomes equivalent to a signal generation device. Moreover, in that case, an information processing device (such as a personal computer or a cellular terminal) that includes the speech obtaining unit 101 and the converting unit 102 can receive and output the time-series signals generated by the server device 200-2.

The server device 200-2 can be configured either using a single physical hardware assembly or using one or more hardware assemblies. Alternatively, the server device 200-2 can be built in the cloud environment.

During the signal generation operation according to the second embodiment, the overall flow of operations is identical to the flowchart of the signal generation operation according to the first embodiment, as illustrated in FIG. 4. Hence, that explanation is not given again.

In this way, in the second embodiment, the functions identical to the first embodiment are implemented using a system that includes a plurality of devices.

Figure 9:
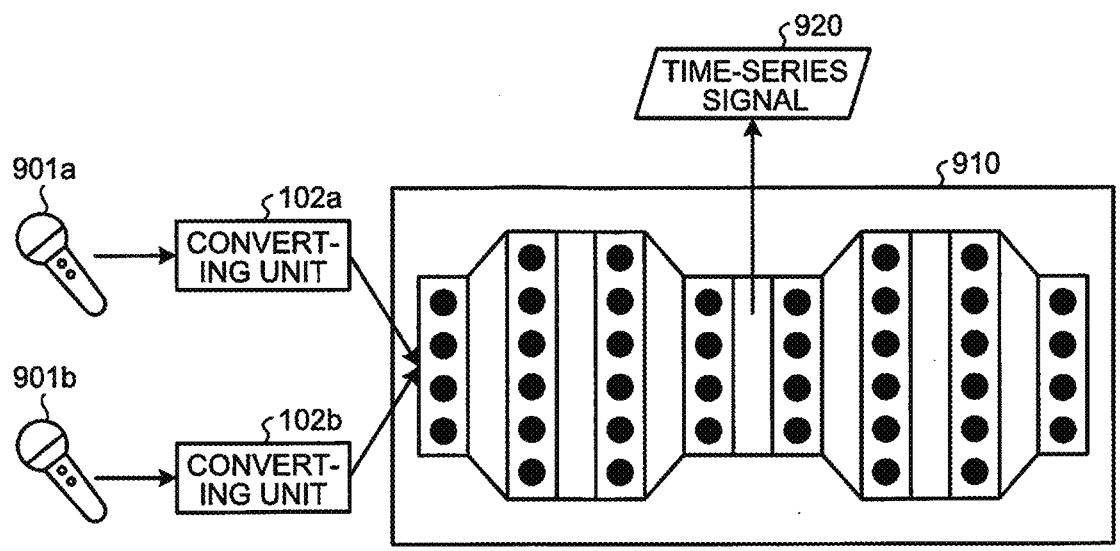
FIG. 9 is a diagram illustrating a utilization example of the signal generation device (the signal generation system)

Given below is the explanation of a utilization example of the embodiments. FIG. 9 is a diagram illustrating a utilization example of the signal generation device (the signal generation system).

In FIG. 9 is illustrated an example in which the embodiment is implemented in a speech recognition system in which speeches are obtained using a microphone array; and the speech of the target speaker is enhanced so as to enable recognition of the speech of the target speaker. As illustrated in FIG. 9, the speech recognition system includes two microphones 901a and 901b, two converting units 102a and 102b, and a neural network 910.

The microphones 901a and 901b represent microphones included in a microphone array.

The converting units 102a and 102b implement the identical function to the converting unit 102, and convert the speeches obtained from the microphones 901a and 901b, respectively. Alternatively, a single converting unit 102 can be configured to convert the speeches obtained from the microphones 901a and 901b. The speech waveforms collected by the microphones 901a and 901b are converted into the information about amplitudes and phases by the converting units 102a and 102b, respectively.

The neural network processing unit 103 inputs the information about converted amplitudes and converted phases to the neural network 910, and performs arithmetic operations. The neural network 910 is divided into two portions, namely, a first half portion ranging from the input layer to the hidden layer that obtains a time-series signal 920, and a second half portion that includes the layers present after that hidden layer. The first half portion is equivalent to a neural network that fulfils the role of a beamformer for performing learning in such a way that the speech of the target speaker is output in the enhanced form. The second half portion is equivalent to a neural network that fulfils the role of an acoustic model for receiving the information output from the first half portion and performing learning so as to output the posterior probability of each processing unit representing at least either a phoneme, or a syllable, or a character, or a word piece, or a word.

Conventionally, a method called joint training is known for learning the entire neural network integrated in the manner described above. However, in the joint training, for example, it is not possible to check whether or not the speech of the speaker has been enhanced.

According to the embodiments described above, even if such a neural network is used, time-series signals can be generated using the information output from the hidden layers. If the waveforms of the generated time-series signals are converted into sound, then it becomes possible to aurally check whether or not the speech of the target speaker has been enhanced.

As described above, according to the first and second embodiments, whether or not a neural network has been correctly processed can be checked in a more efficient manner.

Figure 10:
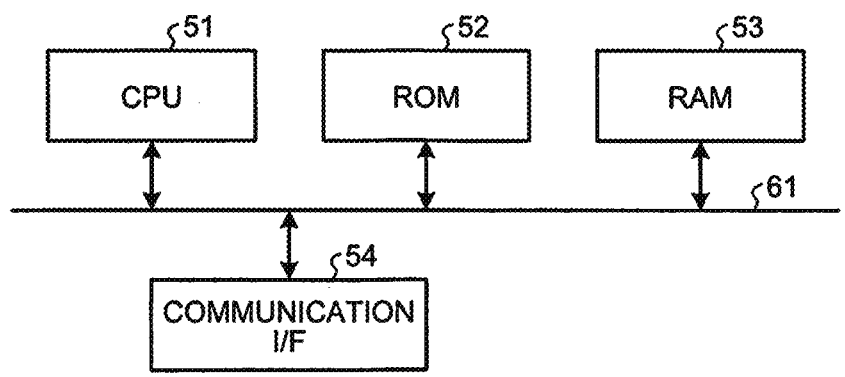
FIG. 10 is an explanatory diagram illustrating a hardware configuration of the devices according to the first and second embodiments.

Explained below with reference to FIG. 10 is a hardware configuration of the devices (the signals generation device and the server device) according to the first and second embodiments. FIG. 10 is an explanatory diagram illustrating an exemplary hardware configuration of the devices according to the first and second embodiments.

Each device according to the first embodiment or the second embodiment includes a control device such as a CPU 51; memory devices such as a read only memory (ROM) 52 or a RAM 53; a communication interface (I/F) 54 that establishes connection with a network and performs communication; and a bus 61 that connects the constituent elements to each other.

The computer programs that are executed in the devices according to the first and second embodiments are stored in advance in the ROM 52.

Alternatively, the computer programs that are executed in the devices according to the first and second embodiments can be recorded as installable files or executable files in a computer-readable recording medium such as a compact disk read only memory (CD-ROM), a flexible disk (FD), a compact disk recordable (CD-R), or a digital versatile disk (DVD); and can be provided as a computer program product.

Still alternatively, the computer programs that are executed in the devices according to the first and second embodiments can be stored in a downloadable manner in a computer connected to a network such as the Internet. Still alternatively, the computer programs that are executed in the devices according to the first and second embodiments can be distributed via a network such as the Internet.

The computer programs that are executed in the devices according to the first and second embodiments can make a computer function as the constituent elements of the devices described above. In that computer, the CPU 51 reads the computer programs from a computer-readable memory medium into a main memory device, and executes them.

Modification Example

The devices according to the first and second embodiments can be used in recognizing particular speakers. For example, consider a case in which noise is suppressed and the voice of the speaker is enhanced from the speech obtained in a situation in which a single person talks for a long period of time during a press conference, or a lecture presentation, or a conference presentation. In that case, using the signal generation device, the signal generation system, the signal generation method, and the computer program product according to the first embodiment or the second embodiment; the suppression state of the noise of the obtained speech can be concretely reproduced as a speech. When a user actually listens to the reproduced speech, he or she can check whether the noise has been sufficiently suppressed. Moreover, when a portable microphone is set for obtaining the speech, it becomes possible for the user to check, by listening to the sound, the result of testing the location and the sound collection direction of the microphone, such as the noise is not enhanced or the echo is less. That is also applicable for the acoustic of the musical instruments used in a concert.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal generation device comprising:
one or more processors configured to:

convert an acoustic signal and output amplitude and phase at a plurality of frequencies;

for each of a plurality of nodes of a hidden layer included in a neural network that treats the amplitude and the phase as input, obtain a frequency based on a plurality of weights, each of the plurality of weights being multiplied with an output of a corresponding node in a previous layer; and generate an acoustic signal based on the plurality of obtained frequencies and based on amplitude and phase corresponding to each of the plurality of nodes, wherein the one or more processors obtain the frequency that is set for a node in the previous layer corresponding to a weight having a highest absolute value.

2. A signal generation device according to claim 1, wherein the neural network is a complex-valued neural network that includes a layer for inputting and outputting complex numbers.

3. The signal generation device according to claim 2, wherein the one or more processors are further configured to obtain, for a plurality of nodes present in a hidden layer for inputting and outputting the complex numbers, a frequency based on absolute values of the plurality of weights.

4. The signal generation device according to claim 1, wherein the neural network is an acoustic model learnt in such a way that feature of an acoustic signal is input and posterior probability of each processing unit representing at least either a phoneme, or a syllable, or a character, or a word piece, or a word is output.

5. The signal generation device according to claim 1, wherein the neural network is a denoising autoencoder learnt in such a way that feature of an acoustic signal is input and feature having noise eliminated therefrom is output.

6. A signal generation device according to claim 1, wherein the one or more processors are further configured to:

generate, for each of the plurality of nodes, a signal based on the obtained frequency, corresponding amplitude, and corresponding phase, and generate the acoustic signal by synthesizing a plurality of signals generated for the plurality of nodes.

7. A signal generation device according to claim 1, wherein the neural network includes a plurality of hidden layers; and the one or more processors obtain the frequency from the hidden layer that is a layer close to an output layer or a layer close to an input layer among the plurality of hidden layers.

8. A signal generation device according to claim 1, wherein the neural network includes a plurality of hidden layers; and the one or more processors obtain the frequency from one or more hidden layers among the plurality of hidden layers; and generate the acoustic signal for each of the one or more hidden layers.

9. A signal generation system comprising:

one or more processors configured to:

convert an acoustic signal and output amplitude and phase at a plurality of frequencies;

for each of a plurality of nodes of a hidden layer included in a neural network that treats the amplitude and the phase as input, obtain a frequency based on a plurality of weights, each of the plurality of weights being multiplied with an output of a corresponding node in a previous layer; and generate an acoustic signal based on the plurality of obtained frequencies and based on amplitude and phase corresponding to each of the plurality of nodes, wherein the one or more processors obtain the frequency that is set for a node in the previous layer corresponding to a weight having a highest absolute value.

10. A signal generation method comprising:

converting that includes converting an acoustic signal and outputting amplitude and phase at a plurality of frequencies;

obtaining, for each of a plurality of nodes of a hidden layer included in a neural network that treats the amplitude and the phase as input, a frequency based on a plurality of weights, each of the plurality of weights being multiplied with an output of a corresponding node in a previous layer; and generating an acoustic signal based on the plurality of obtained frequencies and based on amplitude and phase corresponding to each of the plurality of nodes, wherein the obtaining include obtaining the frequency that is set for a node in the previous layer corresponding to a weight having a highest absolute value.

11. A computer program product having a non-transitory computer readable medium including programmed instructions, wherein the instructions, when executed by a computer, cause the computer to perform:

converting an acoustic signal and output amplitude and phase at a plurality of frequencies;

for each of a plurality of nodes of a hidden layer included in a neural network that treats the amplitude and the phase as input, obtaining a frequency based on a plurality of weights, each of the plurality of weights being multiplied with an output of a corresponding node in a previous layer; and generating an acoustic signal based on the plurality of obtained frequencies and based on amplitude and phase corresponding to each of the plurality of nodes, wherein the obtaining include obtaining the frequency that is set for a node in the previous layer corresponding to a weight having a highest absolute value.

* * * * *